(12) United States Patent
Zhou

(10) Patent No.: US 11,223,713 B1
(45) Date of Patent: Jan. 11, 2022

(54) WEARABLE MOBILE PHONE HOLDER

(71) Applicant: Jinlong Zhou, Changsha (CN)

(72) Inventor: Jinlong Zhou, Changsha (CN)

( * ) Notice: Subject to any disclaimer, the term of this patent is extended or adjusted under 35 U.S.C. 154(b) by 0 days.

(21) Appl. No.: 17/289,740

(22) PCT Filed: Oct. 17, 2019

(86) PCT No.: PCT/CN2019/111652
§ 371 (c)(1),
(2) Date: Apr. 29, 2021

(87) PCT Pub. No.: WO2020/088259
PCT Pub. Date: May 7, 2020

(51) Int. Cl.
*H04M 1/04* (2006.01)
*H04B 1/3877* (2015.01)

(52) U.S. Cl.
CPC .................................... *H04M 1/04* (2013.01)

(58) Field of Classification Search
CPC ...... H04M 1/04; H04M 1/0202; H04M 1/035; H04B 1/3838; H04B 1/3877; H04B 1/3888; G06F 1/1601; G06F 1/1613
See application file for complete search history.

(56) References Cited

U.S. PATENT DOCUMENTS

| | | |
|---|---|---|
| 2006/0183511 A1 | 8/2006 | Shen |
| 2014/0263931 A1 | 9/2014 | Chen |
| 2017/0179989 A1* | 6/2017 | An .................. H04B 1/3822 |
| 2020/0252494 A1* | 8/2020 | Li ........................ H04M 1/04 |
| 2020/0254940 A1* | 8/2020 | Dang ................ B60R 11/0252 |
| 2020/0343924 A1* | 10/2020 | Jackson .................. H04M 1/04 |
| 2020/0397273 A1* | 12/2020 | Meyer ..................... G06T 7/62 |
| 2021/0103317 A1* | 4/2021 | Raju ..................... G06F 1/203 |

FOREIGN PATENT DOCUMENTS

| | | |
|---|---|---|
| CN | 205792798 U | 12/2016 |
| CN | 106603779 A | 4/2017 |
| CN | 206802718 U | 12/2017 |
| CN | 109327586 A | 2/2019 |

* cited by examiner

*Primary Examiner* — Thanh G Le
(74) *Attorney, Agent, or Firm* — Bayramoglu Law Offices LLC

(57) ABSTRACT

A wearable mobile phone holder includes a holding part, a base, clamping teeth and a latch. The base is pivotally connected to the holding part through a pivot shaft. The clamping teeth are arranged on the holding part, and the latch is arranged on the base. The plurality of clamping teeth are arranged along a circumferential direction of the pivot shaft. An end of the latch is inserted into a clamping teeth gap between the clamping teeth. The mobile phone can be quickly installed into or removed from the wearable mobile phone holder by only rotating the pressing head. The mobile phone can be tightly clamped and positioned by the spring in the rotary pressing mechanism, which can be easily and quickly operated. The distance between the clamping jaws can be adjusted to adapt to mobile phones of different models and sizes to improve the generality of the holder.

8 Claims, 4 Drawing Sheets

WEARABLE MOBILE PHONE HOLDER

CROSS REFERENCE TO THE RELATED APPLICATIONS

This application is the national phase entry of International Application No. PCT/CN2019/111652, filed on Oct. 17, 2019, which is based upon and claims priority to Chinese Patent Application No. 201811284643.8, filed on Oct. 31, 2018, the entire contents of which are incorporated herein by reference.

TECHNICAL FIELD

The present invention relates to the technical field of mobile phone accessories, and in particular, to a wearable mobile phone holder.

BACKGROUND

Handheld products such as mobile phones and tablet computers have become ubiquitous. Mobile phones, for example, not only serve as a communication tool, but also have become multifunctional media players with an integration of audio playback, video playback, navigation, and Internet access functionality. Mobile phones are so portable that people can use their mobile phones for entertainment, socializing, information-seeking and so on wherever and whenever possible. People are also spending more time using their mobile phones than before. As a result, mobile phone holders have been developed.

Current mobile phone holders typically include desktop holders, portable holders, and wearable holders. Among them, the existing wearable holders at least have the following minor shortcomings. For example, since the mobile phone receiving part and the lashing strap part are typically fixed relative to each other, users can hardly rotate the mobile phone receiving part to obtain an optimal viewing angle. Moreover, these wearable holders cannot adapt to the newly emerging mobile payment modes such as WeChat payment, or only provide a single mode such that users cannot freely choose between a rotatable mode and a relatively fixed mode, or require an unsatisfactory process of installing and removing the mobile phone, which affects user experience.

It is, therefore, highly desirable to provide an improved portable wearable holder for a more complete user experience.

SUMMARY

An objective of the present invention is to provide a wearable mobile phone holder to solve the above-mentioned problems.

In order to achieve the above-mentioned objective, the present invention provides a wearable mobile phone holder, including a holding part and a base. The base is pivotally connected to the holding part through a pivot shaft. The wearable mobile phone holder further includes clamping teeth and a latch. The clamping teeth are arranged on the holding part, and the latch is arranged on the base. The plurality of clamping teeth are arranged along the circumferential direction of the pivot shaft. The end of the latch is inserted into a clamping teeth gap between the clamping teeth.

Further, the clamping teeth are evenly distributed on the holding part along the circumferential direction of the pivot shaft. A latch mounting base is arranged on the base. The latch mounting base is provided with a latch hole opposite to the clamping teeth gap. The latch is inserted into the latch hole.

Further, the latch includes a push-pull rod and a latching head. The push-pull rod is inserted into the latch hole. A limiting flange is arranged between the push-pull rod and the latching head to prevent the latch from sliding out.

Further, the latch hole is a polygonal hole, and the push-pull rod is a polygonal rod matched with the polygonal hole.

Further, the holding part includes a clamping jaw, a mounting plate, and a rotary pressing mechanism. The clamping jaw and the rotary pressing mechanism are arranged on side edges of the mounting plate to form a clamping cavity for clamping a mobile phone. The rotary pressing mechanism is provided with a pressing head, and the pressing head rotates in a plane on one side of the mounting plate to open and close the clamping cavity.

Further, the rotary pressing mechanism further includes a rotating shaft, a spring, and a bearing block. The end of the rotating shaft adjacent to the mounting plate is fixedly connected to the pressing head. The rotating shaft is inserted into the bearing block. The bearing block is mounted on the lower side of the mounting plate. The rotating shaft is provided with a spring flange. The spring is sleeved on the rotating shaft and is stopped and restricted through the bearing block and the spring flange.

Further, the clamping jaw includes a clamping part configured to clamp the mobile phone and a connecting part connected to the mounting plate. The upper portion of the clamping part extends toward the inner side of the clamping cavity to hook the edge of the mobile phone.

Further, the clamping part is internally provided with a button slot for receiving a button on a side of the mobile phone, and the button slot extends along the edge direction of the mounting plate.

Further, a guiding and limiting groove for guiding and positioning the connecting part is provided in the lower part of the mounting plate. The connecting part is provided with an oblong hole for playing a role of connecting and fixing.

Further, the mounting plate is provided with a groove for receiving a camera of the mobile phone, and the groove is arranged along the length direction or the width direction of the mounting plate.

Further, an anti-slip protrusion is provided in the clamping teeth gap, and an anti-slip groove matched with the clamping teeth gap is provided in the latching head. Alternatively, the anti-slip groove is provided in the clamping teeth gap, and the anti-slip protrusion matched with the clamping teeth gap is provided on the latching head.

Further, the clamping jaw includes a clamping jaw upper half and a clamping jaw lower half hinged to each other, and the clamping jaw upper half is rotatable toward the inner side of the clamping cavity.

Further, the side of the clamping jaw upper half located adjacent to the clamping jaw lower half is provided with a clamping jaw protrusion, and the side of the clamping jaw lower half located adjacent to the clamping jaw upper half is provided with a clamping jaw groove for clamping the clamping jaw protrusion. Alternatively, the side of the clamping jaw lower half located adjacent to the clamping jaw upper half is provided with the clamping jaw protrusion, and the side of the clamping jaw upper half located adjacent to the clamping jaw lower half is provided with the clamping jaw groove for clamping the clamping jaw protrusion.

Compared with the prior art, the present invention has the following advantages.

In the present invention, the base and the holding part are provided with two modes, namely a rotatable mode and a relatively fixed mode, such that users can choose between the rotatable mode and the relatively fixed mode by withdrawing and inserting the latch. Different from the single rotation mode of the prior wearable mobile phone holder, the wearable mobile phone holder of the present invention can be switched between the rotatable mode and the relatively fixed mode, rather than adopting a compromise way, such that the rotatable mode and the relatively fixed mode are each independently operable relative to the other to fully exploit their respective advantages. The rotatable mode of the present invention is experimentally proved to be capable of greatly reducing the frictional force when the base and the holding part rotates under the promise that its advantages are fully exploited, such that users can comfortably and easily turn the mobile phone with one finger to adjust the viewing angle, thus improving user experience. The relatively fixed mode of the present invention, when fully exploited in its advantages, can maintain the relative stillness between the holding part and the base when the user walks or shops and even vigorously runs or exercises, and thus has stability and continuity. Moreover, when the mobile phone needs to be taken out from the wearable mobile phone holder, it is only necessary to rotate the pressing head with one finger to quickly take out the mobile phone. After the mobile phone is installed, the mobile phone can be tightly clamped and positioned by the pressing head and the spring in the rotary pressing mechanism, which can be easily and quickly operated in a natural and unrestrained fashion. Furthermore, the distance between the clamping jaws can be adjusted to adapt to mobile phones of different models and sizes to improve the generality of the holder. The holder is aesthetically attractive and stylish, has a simple structure, is convenient to use, and is thus easy to get popularized on the market.

Hereinafter, the present invention will be described in further detail with reference to the drawings.

BRIEF DESCRIPTION OF THE DRAWINGS

The drawings constitute a part of the present invention and are used to provide a further understanding of the present invention. The exemplary embodiments of the present invention and the description thereof are used to explain the present invention, but do not constitute an improper limitation to the present invention. In the drawings.

In the figures.

Figure 1:
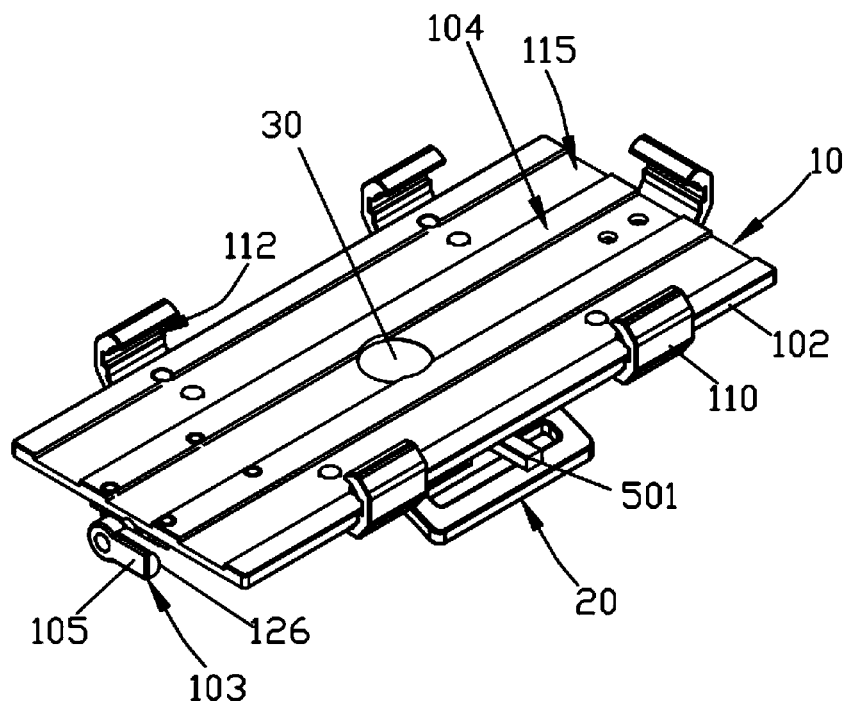
FIG. 1 is a perspective view of a wearable mobile phone holder according to a preferred embodiment of the present invention.
Figure 2:
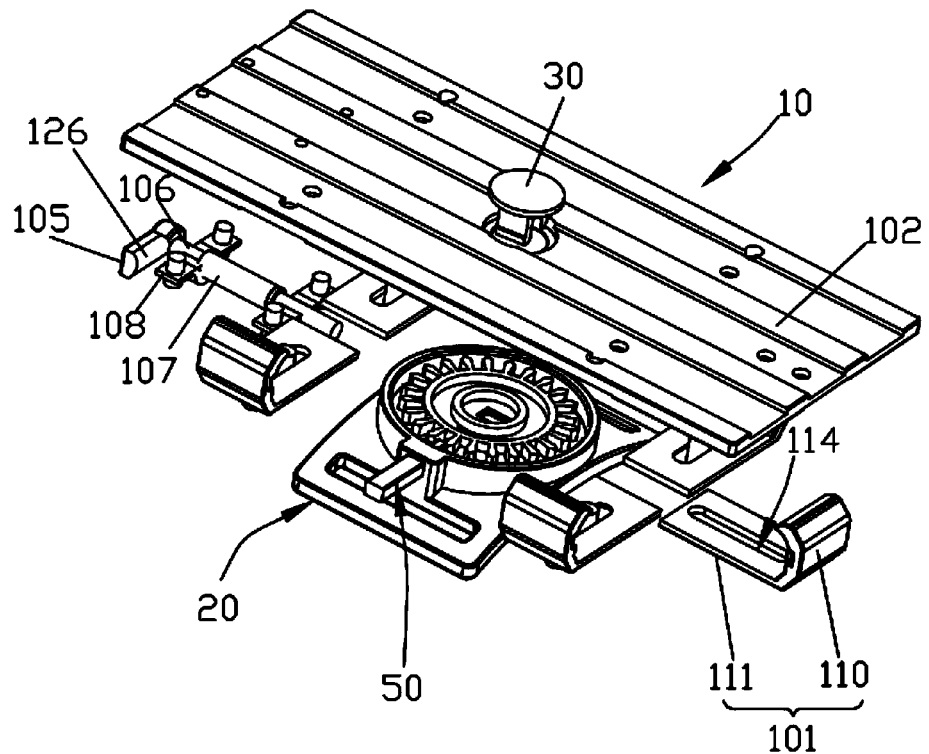
FIG. 2 is a first exploded view of the wearable mobile phone holder according to the preferred embodiment of the present invention.
Figure 3:
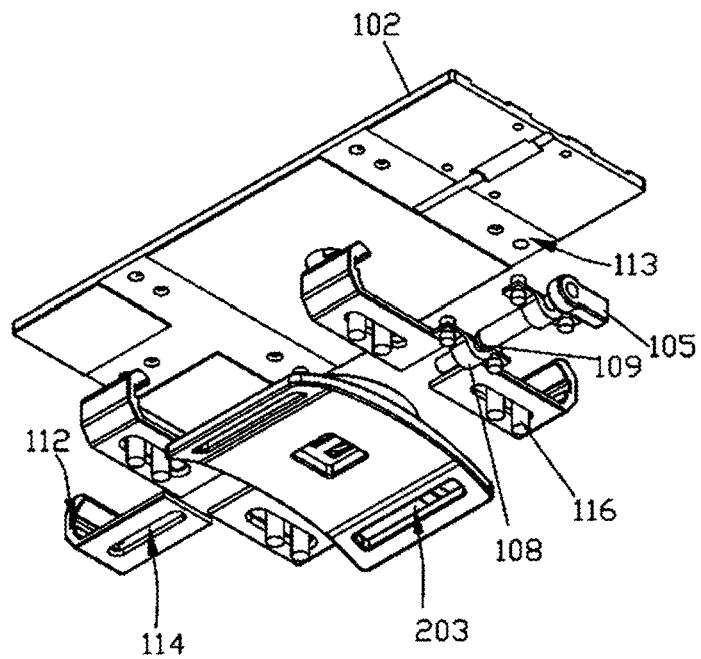
FIG. 3 is a second exploded view of the wearable mobile phone holder according to the preferred embodiment of the present invention.
Figure 4:
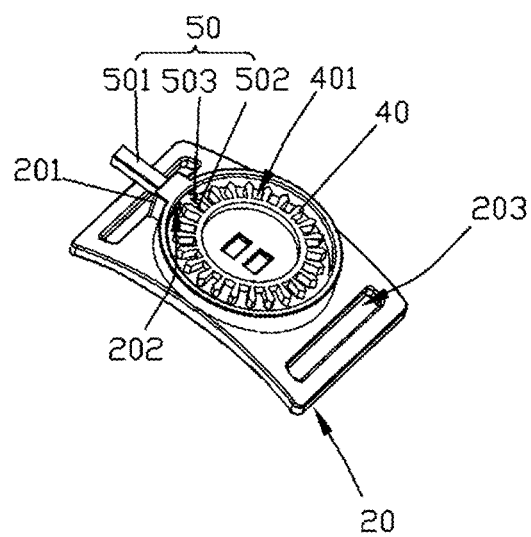
FIG. 4 is a perspective view of the base (including the clamping teeth of the holding part) of the wearable mobile phone holder according to the preferred embodiment of the present invention.
Figure 5:
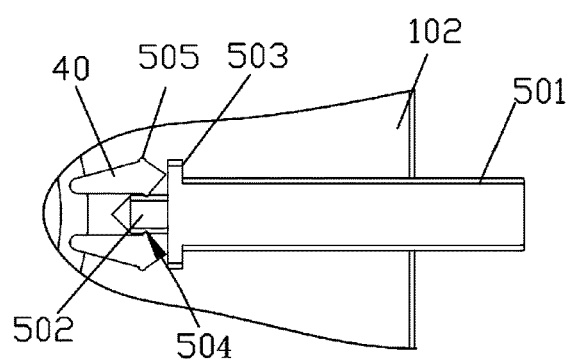
FIG. 5 is a schematic view of the cooperation between the clamping teeth and the clamping teeth gap according to the preferred embodiment of the present invention.

10, holding part; 101, clamping jaw; 102, mounting plate; 103, rotary pressing mechanism; 104, clamping cavity; 105, pressing head; 106, rotating shaft; 107, spring; 108, bearing block; 109, spring flange; 110, clamping part; 111, connecting part; 112, button slot; 113, guiding and limiting groove; 114, oblong hole; 115, groove; 116, screw; 117, fixed plate; 118, folding plate 119, clamping jaw upper half; 120, clamping jaw lower half; 121, clamping protrusion; 122, clamping groove; 123, hinge; 124, clamping jaw protrusion; 125, clamping jaw groove; 126, circular arc transition structure;

20, base; 201, latch mounting base; 202, latch hole; 203, lashing hole;

30, pivot shaft;

40, clamping teeth; 401, clamping teeth gap;

50, latch; 501, push-pull rod; 502, latching head; 503, limiting flange; 504, anti-slip groove; and 505, anti-slip protrusion.

DETAILED DESCRIPTION OF THE EMBODIMENTS

The embodiments of the present invention will be described in detail below with reference to the drawings, but the present invention can be implemented in different ways defined and covered by the claims.

As shown in FIGS. 1-5, the present invention provides a wearable mobile phone holder, including the holding part 10 and the base 20. Each of the holding part 10 and the base 20 can be integrally formed by injection molding. The base 20 is pivotally connected to the holding part 10 through the pivot shaft 30. The holding part 10 is mainly configured to hold the mobile phone. The lower end of the base 20 is provided with an arc contact surface matched with an arm. Each of the two ends of the base 20 is provided with the lashing hole 203 for installing a lashing strap. The pivot shaft 30 is a pressing buckle structure configured to connect and attach the holding part 10 to the base 20, while functioning as a rotating shaft. In the present embodiment, one of the holding part 10 and the base 20 is provided with a plurality of clamping teeth 40 along the circumferential direction of the pivot shaft 30. The other one of the holding part 10 and the base 20 is provided with the latch 50. The end of the latch 50 can be inserted into the clamping teeth gap 401 between the clamping teeth 40. In use, the holding part 10 and the base 20 are engaged and disengaged only by inserting and withdrawing the latch 50. When the latch 50 is inserted into the clamping teeth gap 401, the holding part 10 and the base 20 remain relatively fixed. After the latch 50 is pulled out of the clamping teeth gap 401, the rotation angle between the holding part 10 and the base 20 can be adjusted. The latch 50 is inserted into and pulled out of the clamping teeth gap 401 to fix the holding part 10 and adjust the rotation angle, respectively.

In the present embodiment, the clamping teeth 40 are evenly distributed on the holding part 10 along the circumferential direction of the pivot shaft 30. The latch mounting base 201 is arranged on the base 20. The latch mounting base 201 is an annular support structure that is attached to the lower side wall of the holding part 10. The latch mounting base 201 is provided with the latch hole 202 opposite to the clamping teeth gap 401. The latch 50 is inserted into the latch hole 202. Specifically, the latch 50 includes the push-pull rod 501 and the latching head 502. The push-pull rod 501 is inserted into the latch hole 202. The limiting flange 503 is arranged between the push-pull rod 501 and the latching head 502 to prevent the latch 50 from sliding out.

In the present embodiment, the latch hole 202 is a square hole and the push-pull rod 501 is a square rod matched with the square hole to prevent the latch 50 from shaking from side to side, thereby protecting the clamping teeth 40 on both sides of the latching head 502, while improving the stability of the holder.

Further, in the present embodiment, when the user wears the mobile phone holder, in order to prevent the latch 50 from shaking and sliding out of the clamping teeth gap 401 and to further prevent the mobile phone from rotating freely, the anti-slip protrusion 505 is provided in the clamping teeth gap 401, and the anti-slip groove 504 matched with the clamping teeth gap 401 is provided in the latching head 502. Alternatively, the anti-slip groove 504 is provided in the clamping teeth gap 401, and the anti-slip protrusion 505 matched with the clamping teeth gap 401 is provided on the latching head 502. In this way, when the latch 50 is inserted into the clamping teeth gap 401, the anti-slip protrusion 505 is squeezed into the anti-slip groove 504 to lock the latch 50 and the clamping teeth gap 401, thereby ensuring the user experience. Optionally, the above objective can also be achieved by making the width of the latching head 502 slightly larger than the width of the clamping teeth gap 401 to increase the frictional force between the elastic latch 50 and clamping teeth 40.

In the present embodiment, the holding part 10 includes the clamping jaw 101, the mounting plate 102, and the rotary pressing mechanism 103. The mounting plate 102 is pivotally connected to the base 20. Specifically, the clamping jaws 101 are arranged on five sides of the mounting plate 102, so that the clamping jaws 101 and the rotary pressing mechanism 103 are arranged on the side edges of the mounting plate 102 to form the clamping cavity 104 for clamping the mobile phone. The surface of the clamping jaw 101 or the mounting plate 102 is provided with a fluorescent layer that is capable of emitting or reflecting light when used in a dark place to provide caution to others. The fluorescent layer can cooperate with a light source from the mobile phone to emit more illumination. Certainly, the fluorescent layer can also be arranged on other parts of the holder. In addition, the clamping jaw 101 is similar to an L-shaped structure, and includes the clamping part 110 configured to clamp the mobile phone and the connecting part 111 connected to the mounting plate 102. The connecting part 111 is a plate-shaped structure that is fixed to the mounting plate 102 by the screw 116. The upper portion of the clamping part 110 extends toward the inner side of the clamping cavity 104 to hook the edge of the mobile phone more securely. The rotary pressing mechanism 103 is provided with the pressing head 105 that rotates in a plane on one side of the mounting plate 102. When the pressing head 105 rotates downward, the mobile phone in the clamping cavity 104 can be withdrawn.

In the present embodiment, the rotary pressing mechanism 103 further includes the rotating shaft 106, the spring 107 and the bearing block 108. The end of the rotating shaft 106 adjacent to the mounting plate 102 is fixedly connected to the pressing head 105. The rotating shaft 106 is inserted into the bearing block 108 and thus can slidably extend and retract along the axial direction of the bearing block 108. The bearing block 108 is installed on the lower side of the mounting plate 102. The rotating shaft 106 is provided with the spring flange 109. The spring 107 is sleeved on the rotating shaft 106, and is stopped and restricted through the bearing block 108 and the spring flange 109. After the mobile phone is inserted into the clamping cavity 104, the pressing head 105 faces downward at this time. The pressing head 105 is pulled out to the edge of the mobile phone, is rotated upward, and is then released. In this way, the pressing head 105 is pressed tightly against the edge of the mobile phone under the elastic force of the spring 107, thereby quickly installing the mobile phone. At least one of the two sides of the pressing head 105 facing the clamping cavity 104 is provided with a circular arc transition to enable the pressing head 105 to quickly slide along the edge of the mobile phone to the upper side of the mounting plate 102, and to avoid the edges on both sides of the pressing head 105 from scratching the mobile phone. In the present embodiment, each of both sides of the pressing head 105 facing the clamping cavity 104 is provided with the circular arc transition structure 126. In addition, the clamping part 110 is internally provided with the button slot 112 for receiving the button on a side of the mobile phone to prevent the button on the side edge of the mobile phone from contacting or interfering with the clamping jaw 101 when the button slides into the clamping cavity 104, and to avoid the situation that the user needs to readjust the distance between the clamping jaws 101 after the mobile phone is installed. The button slot 112 extends along the edge direction of the mounting plate 102, so that the button on the side edge of the mobile phone can pass along the button slot 112 smoothly. In this way, the user does not need to readjust the distance between the clamping jaws 101.

In the present embodiment, in order to prevent the clamping jaw 101 from shaking from side to side, the guiding and limiting groove 113 for guiding and positioning the connecting part 111 is provided in the lower part of the mounting plate 102 to clamp and position the connecting part 111. The connecting part 111 is provided with the oblong hole 114 for playing a role of connecting and fixing, and the screw 116 is installed inside the oblong hole 114 in a penetrating manner. The oblong hole 114 is configured to facilitate the clamping jaw 101 to move in the guiding and limiting groove 113, thereby ensuring adjustability of lengths and widths of the clamping cavity 104. When the clamping jaw 101 fails to move forward when stopped by the edge of a specific mobile phone, the length, width and height of the clamping cavity 104 are accordingly adjusted to be matched with the particular mobile phone model. In this way, the clamping cavity 104 can adaptively clamp mobile phones with different lengths, widths and heights.

Since some mobile phones are provided with raised cameras on their back sides, in order to avoid scratches or wear on the camera on the mounting plate 102, in the present embodiment, the mounting plate 102 is provided with the groove 115 for receiving the camera of the mobile phone, and the groove 115 is arranged along the length direction of the mounting plate 102 (optionally, if the clamping cavity 104 is opened and closed sideways, then the groove 115 should be arranged along the width direction of the mounting plate 102). In this way, the raised camera on the back side of the mobile phone can smoothly pass along the groove 115 to facilitate the installation of the mobile phone, and the groove 115 also has the function of receiving the camera of the mobile phone.

Embodiment 2

Figure 6:
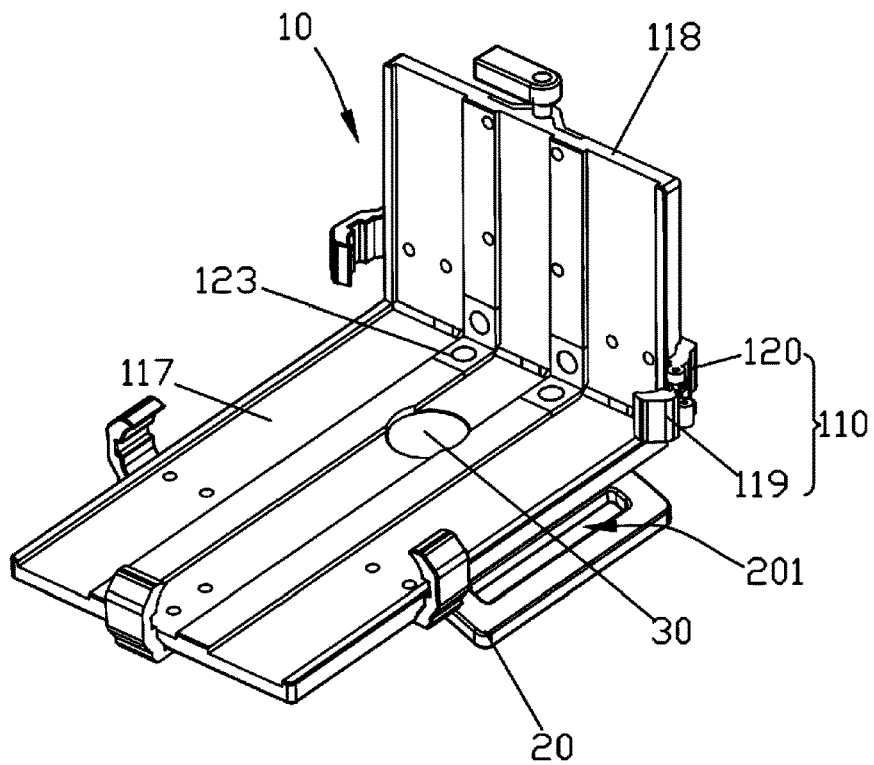
FIG. 6 is a first perspective view of a mobile phone holder according to Embodiment 2 of the present invention.
Figure 7:
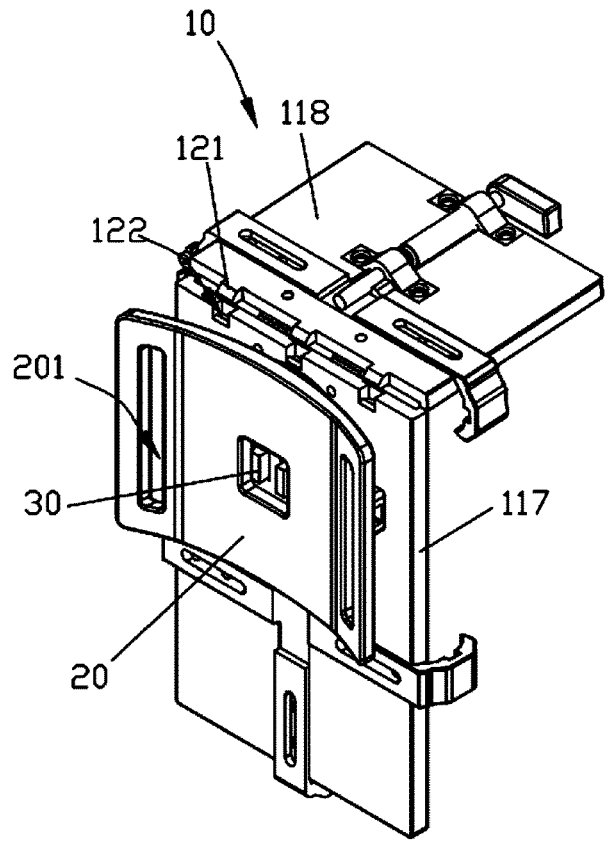
FIG. 7 is a second perspective view of the mobile phone holder according to Embodiment 2 of the present invention.
Figure 8:
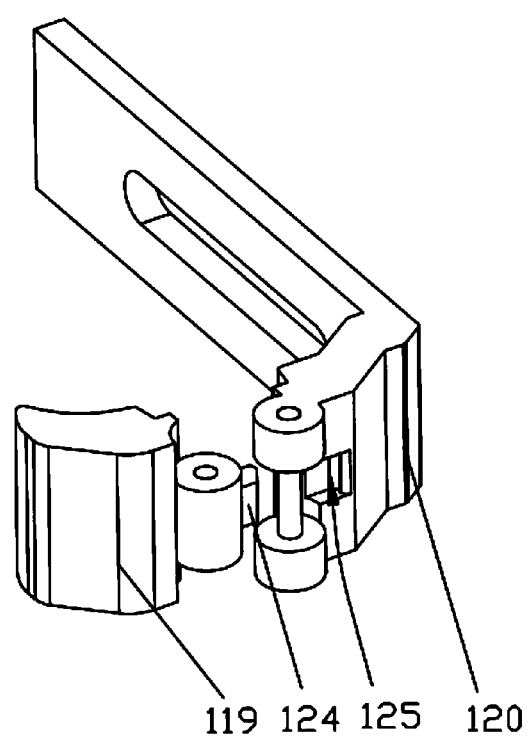
FIG. 8 is an exploded view of a clamping jaw of the mobile phone holder according to Embodiment 2 of the present invention.

As shown in FIGS. 6-8, in the present embodiment, in order to facilitate folding and storing the mobile phone holder, the mounting plate 102 includes the fixed plate 117 on one side and the folding plate 118 on the other side. The folding plate 118 and the fixed plate 117 are connected by the hinge 123. The fixed plate 117 is connected to the base 20 by the pressing buckle 30. Further, the side of the folding plate 118 opposite to the fixed plate 117 is provided with the clamping protrusion 121, and the fixed plate 117 is provided with the clamping groove 122 for clamping the clamping protrusion 121. Optionally, it is also feasible to arrange the clamping protrusion 121 on the fixed plate 117, and arrange the clamping groove 122 on the folding plate 118. After being engaged with each other, the folding plate 118 and the fixed plate 117 will not automatically bend without external force, thereby preventing the folding plate 118 from being bent. In this way, the mobile phone can be conveniently placed therein again after being removed for use. In addition, the clamping jaw 101 includes the clamping jaw upper half 119 and the clamping jaw lower half 120 pivotally connected to each other (FIG. 6 or 9 only shows one of the clamping jaws 101, and the other clamping jaws 101 are similar). The clamping jaw upper half 119 is capable of rotating toward the inner side of the clamping cavity 104 through a pivot shaft, while the clamping jaw lower half 120 is fixedly connected to the mounting plate 102, so that the clamping jaw can be folded to reduce space occupation, while avoiding discomfort or inconvenience caused by a sharp part of the clamping jaw 101 that may hook other objects when the holder is placed into a pocket. The position of the clamping jaw upper half 119 adjacent to the pivot joint is provided with the clamping jaw protrusion 124, while the clamping jaw lower half 120 is provided with the clamping jaw groove 125. Optionally, the clamping jaw protrusion 124 may be arranged on the clamping jaw lower half 120, and the clamping jaw groove 125 may be arranged on the clamping jaw upper half 119. As such, on the one hand, the clamping jaw 119 can clamp the mobile phone securely. When the mobile phone is temporarily taken out, the clamping jaw upper half 119 is clamped by the clamping jaw groove 125, so that the clamping cavity 104 remains fixed in place, and the mobile phone can be conveniently placed therein again after being temporarily taken out. On the other hand, the clamping jaw upper half 119 can rotate toward the inner side of the clamping cavity 104 to be folded and stored, and is prevented from rotating excessively to the outer side of the clamping cavity 104, thereby maintaining the stability of the clamping cavity 104.

The above are only the preferred embodiments of the present invention and are not used to limit the present invention. For those skilled in the art, the present invention can have various modifications and changes. Any modifications, equivalent replacements, improvements and others made within the spirit and principle of the present invention shall fall within the scope of protection of the present invention.

What is claimed is:

1. A wearable mobile phone holder, comprising
a holding part and a base;
wherein
the base is pivotally connected to the holding part through a pivot shaft;
the wearable mobile phone holder further comprises a plurality of clamping teeth and a latch;
the plurality of clamping teeth are arranged on the holding part, and the latch is arranged on the base;
the plurality of clamping teeth are arranged along a circumferential direction of the pivot shaft;
an end of the latch is inserted into a clamping teeth gap between the plurality of clamping teeth;
the holding part comprises a clamping jaw, a mounting plate, and a rotary pressing mechanism;
the clamping jaw and the rotary pressing mechanism are arranged on side edges of the mounting plate to form a clamping cavity for clamping a mobile phone;
the rotary pressing mechanism is provided with a pressing head, and
the pressing head rotates in a plane on one side of the mounting plate to open and close the clamping cavity.

2. The wearable mobile phone holder according to claim 1, wherein
the rotary pressing mechanism further comprises a rotating shaft, a spring, and a bearing block;
an end of the rotating shaft adjacent to the mounting plate is fixedly connected to the pressing head;
the rotating shaft is inserted into the bearing block;
the bearing block is mounted on a lower side of the mounting plate;
the rotating shaft is provided with a spring flange;
the spring is sleeved on the rotating shaft, and
the spring is stopped and restricted through the bearing block and the spring flange.

3. The wearable mobile phone holder according to claim 1, wherein
the clamping jaw comprises a clamping part configured to clamp the mobile phone and a connecting part connected to the mounting plate; and
an upper portion of the clamping part extends toward an inner side of the clamping cavity to hook an edge of the mobile phone.

4. The wearable mobile phone holder according to claim 3, wherein
the clamping part is internally provided with a button slot for receiving a button on a side of the mobile phone, and
the button slot extends along an edge direction of the mounting plate.

5. The wearable mobile phone holder according to claim 3, wherein
a guiding and limiting groove for guiding and positioning the connecting part is provided in a lower part of the mounting plate; and
the connecting part is provided with an oblong hole for playing a role of connecting and fixing.

6. The wearable mobile phone holder according to claim 1, wherein
the mounting plate is provided with a groove for receiving a camera of the mobile phone, and
the groove is arranged along a length direction or a width direction of the mounting plate.

7. The wearable mobile phone holder according to claim 1, wherein
the clamping jaw comprises a clamping jaw upper half and a clamping jaw lower half hinged to each other, and
the clamping jaw upper half is rotatable toward an inner side of the clamping cavity.

8. The wearable mobile phone holder according to claim 7, wherein
a side of the clamping jaw upper half located adjacent to the clamping jaw lower half is provided with a clamping jaw protrusion, and a side of the clamping jaw lower half located adjacent to the clamping jaw upper half is provided with a clamping jaw groove for clamping the clamping jaw protrusion; or the side of the clamping jaw lower half located adjacent to the clamping jaw upper half is provided with the clamping jaw protrusion, and the side of the clamping jaw upper half located adjacent to the clamping jaw lower half is provided with the clamping jaw groove for clamping the clamping jaw protrusion.

\* \* \* \* \*